United States Patent [19]

Bartell

[11] 4,042,121

[45] Aug. 16, 1977

[54] DEVICE FOR MOVING A ROCK AT THE ENTRANCE OF A ROCK CRUSHER

[76] Inventor: Maurice James Bartell, 310 S. 1st Ave. E., Duluth, Minn. 55802

[21] Appl. No.: 651,794

[22] Filed: Jan. 23, 1976

[51] Int. Cl.[2] .................................................. B65G 7/00

[52] U.S. Cl. .................................. 214/1 R; 214/1 BB; 214/1 BC; 241/202

[58] Field of Search .................... 214/1 R, 1 B, 1 BB, 214/1 BC, 1 BD, 1 CM, 1 BT, 1 BV, 1 BH, 1 BS, 23, 32, 33, 132, 135 R, 137, 146.5, 148, 141; 241/202; 212/52, 53, 54, 55, 58 R, 61, 64, 66, 68

[56] References Cited

U.S. PATENT DOCUMENTS

| | | | |
|---|---|---|---|
| 951,304 | 3/1910 | Clark et al. | 214/33 X |
| 1,021,710 | 3/1912 | Stauft | 214/32 |
| 2,984,373 | 5/1961 | Przybylski | 214/132 X |
| 3,796,331 | 3/1974 | Dutton | 214/146.5 |

*Primary Examiner*—Frank E. Werner
*Attorney, Agent, or Firm*—Wicks & Nemer

[57] ABSTRACT

A device for moving a rock lodged in a rock crusher which includes a support on which is mounted a first turntable. Connected to and extending from the first turntable is a second turntable the rotational axis of which is offset from the rotational axis of the first turntable. Also provided is a boom pivotally connected to the second turntable. The boom includes an extendable boom member slidably mounted in the main boom portion and on the end thereof a pivotal hook together with means for operating the turntables, boom and hook individually or in combination to place the hook adjacent a rock in a crusher and then move the rock to a position whereby the crusher can accept and crush it.

7 Claims, 14 Drawing Figures

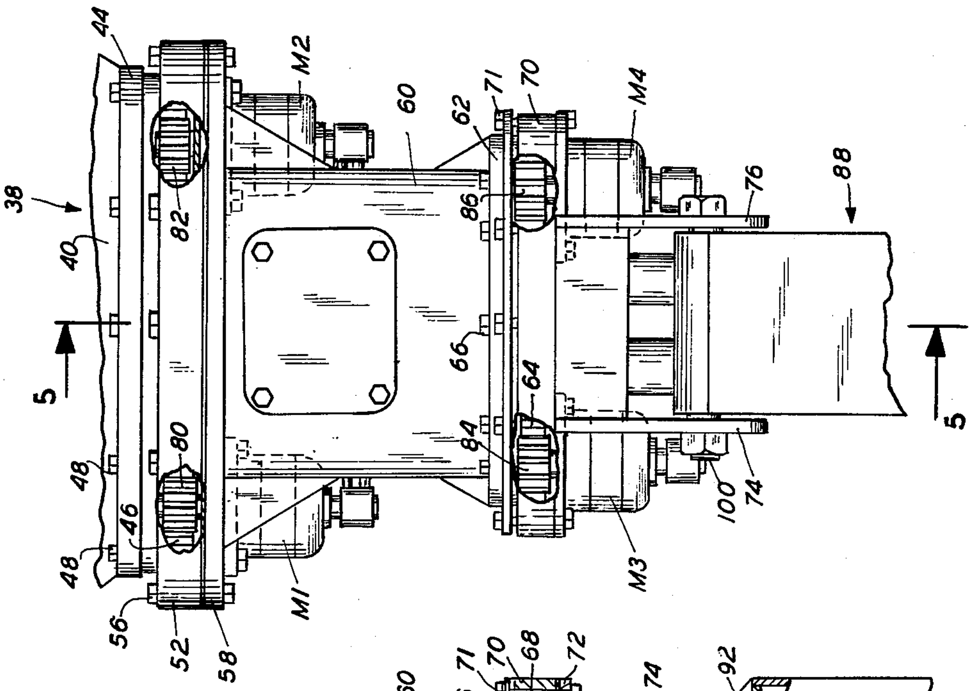
FIG. 4
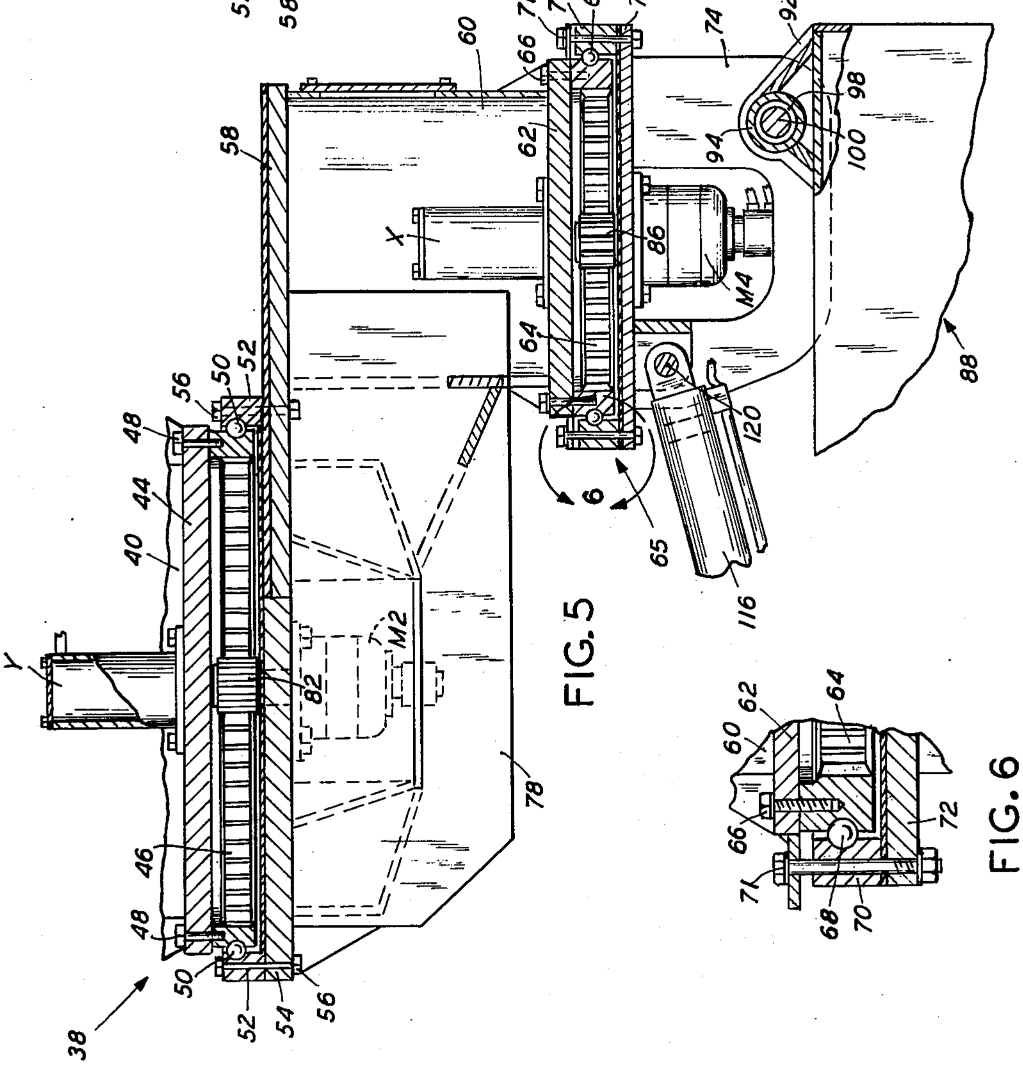
FIG. 5
FIG. 6

DEVICE FOR MOVING A ROCK AT THE ENTRANCE OF A ROCK CRUSHER

SUMMARY

The invention relates to an improvement in a device for reposition of rocks lodged ineffectively in a rock crusher. In the crushing of mineral ores large pieces of ore become lodged in a rock crusher in such a position that the same cannot be crushed by the crusher. In this situation if the rock is moved to a different position in the crusher, the crusher can effectively crush it. To meet this need the present invention has been developed to provide a device which can dislodge a rock in a crusher irrespective of the postion of the rock in the crusher.

The device includes a support on which is mounted a first turntable and connected and extended from the first turntable is a second turntable the rotational axis of which is offset from the rotational axis of the first turntable. Pivotally depending from the second turntable is a boom having an extendable portion on the end of which is mounted a pivotal hook. The turntables may be operated together or individually and alternatively with the main boom or extendable portion and the hook thereon. With the construction of the device a rock may be moved in a crusher to change its position and thereby acceptable to the crusher despite the crusher element and the position of the rock.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 4 is a view on line 4—4 of FIG. 1, portions thereof being broken away.

FIG. 5 is a sectional view on the line 5—5 of FIG. 4.

FIG. 6 is an enlarged sectional view on the line 6—6 of FIG. 5.

Figure 1:
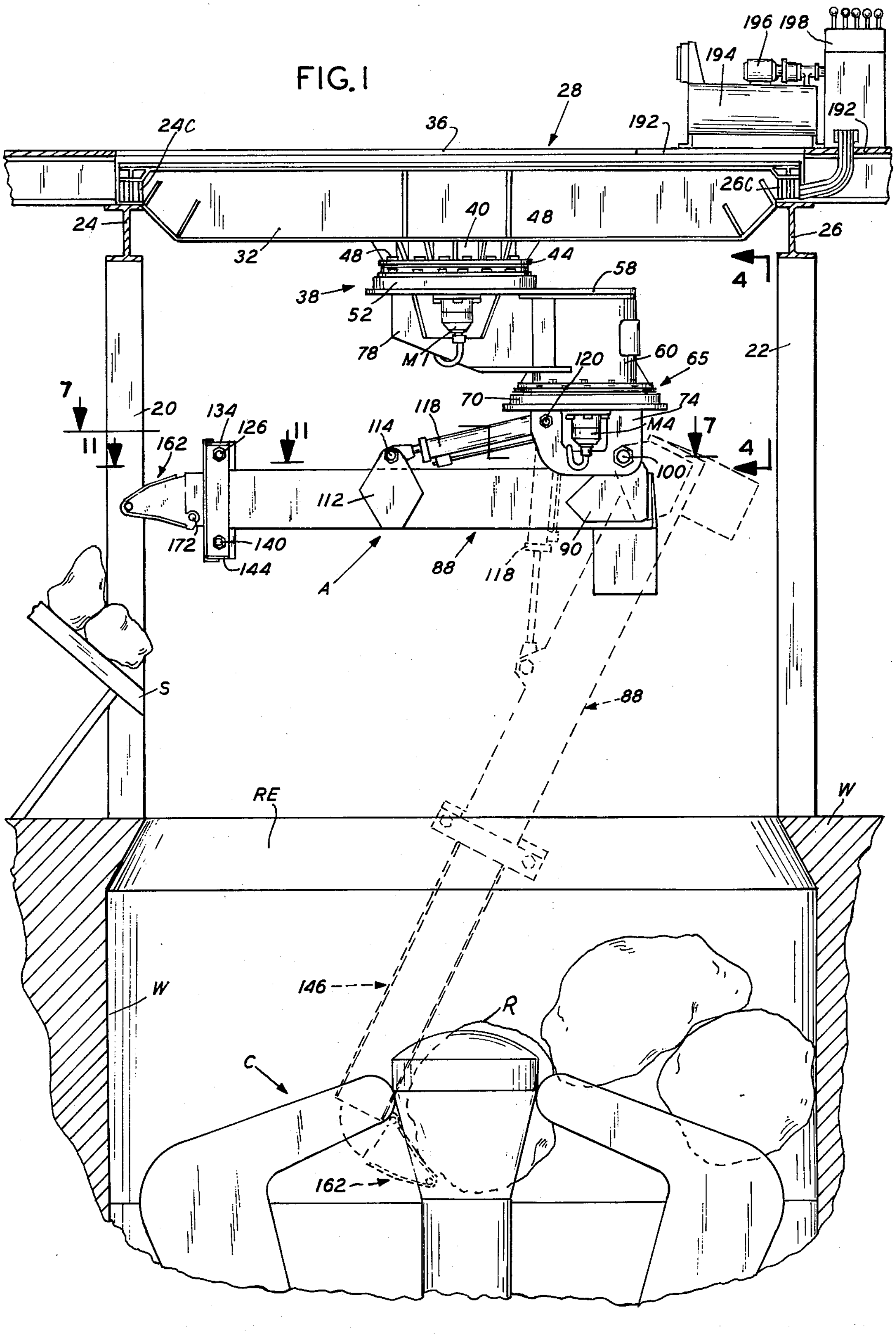
FIG. 1 is an elevational view of a rock hook mounted for use on a supporting structure above a rock crusher, the movable hook on the extended boom engaging a wedged rock shown in broken lines.

Referring to the drawings in detail, the rock hook A is shown in a typical installation above a rock crusher C on an overhead structure showing the hook end of the extendable boom in engagement with a rock R lodged in a bridging condition over the crusher for dislodgment of the rock to a position in which it will drop downwardly into the crusher.

The crusher C is generally mounted within a recess RE formed within a circular solid wall W fed by the conventional slide S.

Figure 2:
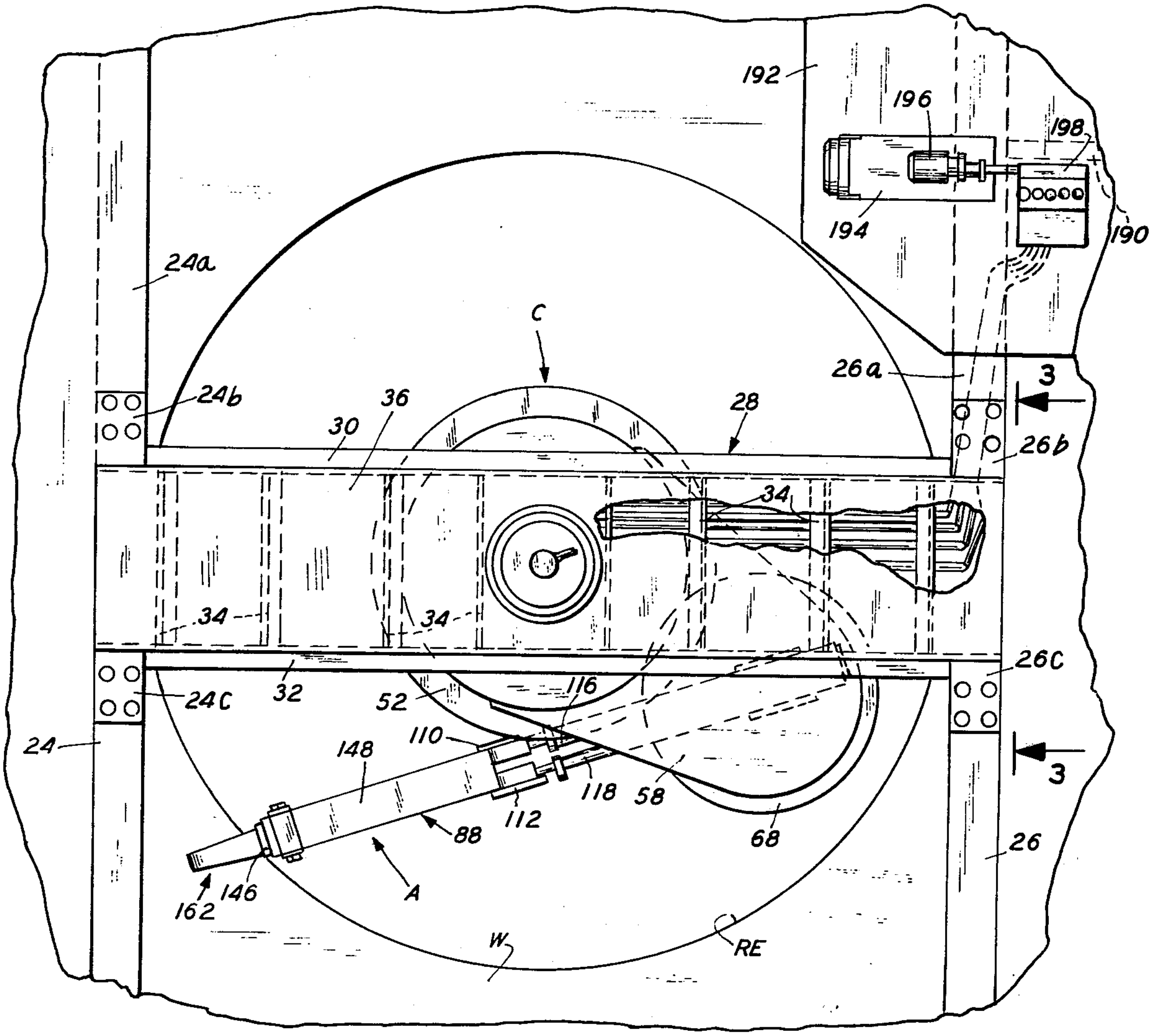
FIG. 2 is a top plan view of the structure shown in FIG. 1.
Figure 3:
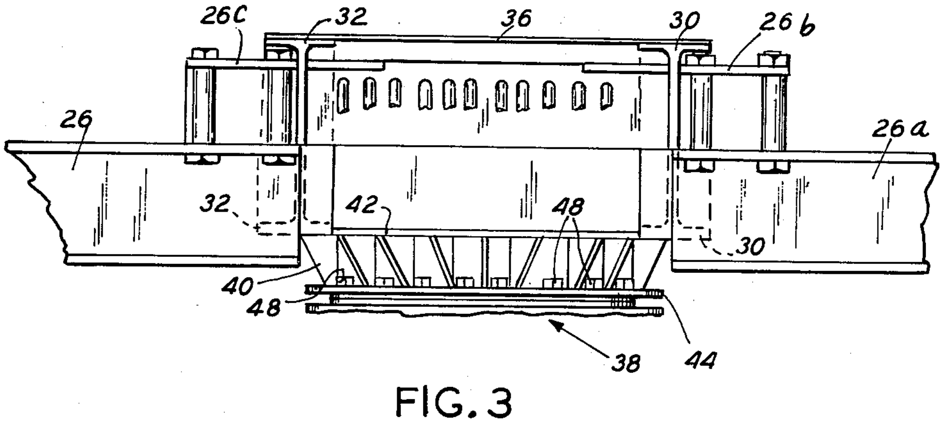
FIG. 3 is a view on the line 3—3 of FIG. 2.

Further provided are pairs of spaced upright standards 20 and 22, and positioned across the top of the standards 20 are the cross beams 24 and **24*a*, and positioned across the top of the standards 22 are the cross beams 26 and 26*a*, particularly FIGS. 1, 2, and 3. The overhead support includes the first longitudinal member 30 connected at one end to the beam 26*a* by means of the connector 26*b* and at the other end to the connector 24*b*. The support 28 also includes the second and spaced longitudinal support 32 connected at one end to the beam 26 by means of connector 26*c* and at the other end to the beam 24 by means of connector 24*c*.**

The overhead support 28 is braced by the spaced cross members 34 covered by sheet platform 36. The numeral 38 designates a first rotatable means in the form of a turntable which includes the circular mounting head 40 which is secured to the mounting plate 42 secured to the longitudinal support members 30 and 32 and the centrally disposed cross members 34, particularly FIGS. 1, 3, 4 and 5. Further provided is the bearing support plate 44 secured to the head 40 by weldment.

The numeral 46 designates a bull ring which is secured to plate 40 by means of the bolts 48. The bull ring gear forms the inner race of the bearing 50, and the outer race 52 of the bearing is bolted to the circular plate 54 by means of bolts 56. The plate 54 has the extension 58 from which depends the circular structure 60. Welded to the lower end of the circular structure 60 is the bearing support plate 62 similar to plate 40. The numeral 64 designates a bull ring gear which is part of a second rotatable means in the form of turntable 65 which is secured to plate 62 by means of bolts 66, and the bull ring gear is the inner race of the bearing 68. The ouer race 70 of the bearing 68 is bolted by bolts 71 to the circular plate 72 the upper part of the spaced head side plates 74 and 76.

Secured to the underside of the plate 54 are a pair of depending spaced side plates 78 each welded at one end to the structure 60. Secured to the underside of the plate 54 is a pair of hydraulic motors M1 and M2 each mounting a pinion gear 80 and 82, respectively, which engage the bull ring gear 46 for driving the bull ring gear. The first rotatable turntable 38 is rotatable a continuous 360° . Secured to the underside of the plate 72 are a pair of hydraulic motors M3 and M4 each mounting a pinion gear 84 and 86, respectively, which engage the bull ring gear 64 for driving the same. The second rotatable turntable 65 is rotatable a continuous 360° . Further provided are the conventional rotatable hydraulic manifolds "*x*" and "*y*" to allow flow of hydraulic fluid to provide a seal between the various pivoting members.

Figure 7:
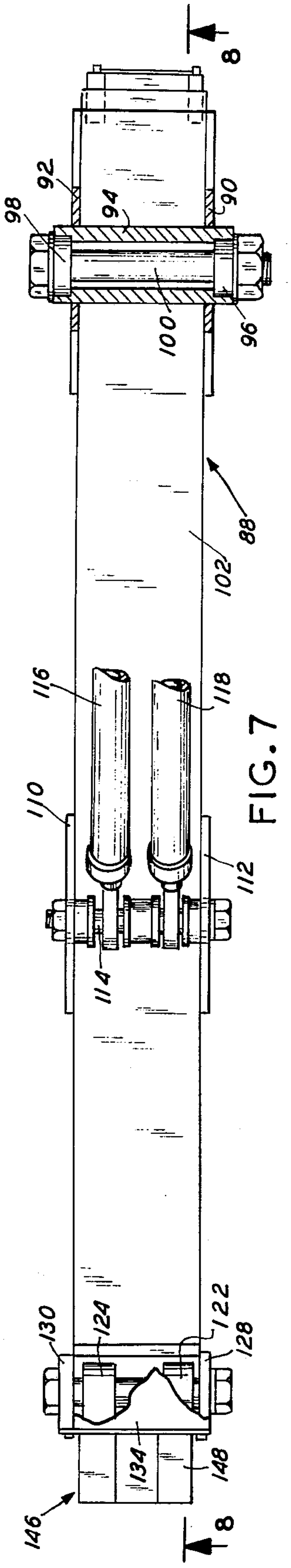
FIG. 7 is a view of the boom on the line 7—7 of FIG. 1 portions of which are in section.

The numeral 88 designates a main hollow boom having the spaced ears 90 and 92 to which is welded the bearing support 94 in which are positioned the bearings 96 and 98 held in place by pin 100. The pin 100 is secured through the head side plates 74 and 76 thereby pivotally mounting the inner end of the main boom 88 to the second turntable 65. The hollow main boom 88 oncludes the top 102, bottom 104 and side walls 106 and 108. For raising and lowering the main boom 88 the ears 110 and 112 are secured to the sides of the boom on which is mounted the pin 114. Secured to the pin 114 is the pair of hydraulic rams 116 and 118 which are also secured to the pin 120 mounted in the head side plate members 74 and 76, particularly FIGS. 5, 7 and 8. The rams 116 and 118 are used to raise and lower the boom.

Mounted on the top of the outer end of the main boom 88 are a pair of rollers 122 and 124 mounted on the shaft 126 connected to the side plates 128 and 130 connected to the brace 132 which are covered by the plate 134. Mounted on the underside of the bottom 104 of the main boom 88 are a pair of rollers 136 and 138 mounted on the shaft 140 connected to the side plates 128 and 130 which are connected to the brace 142 covered by the plate 144.

The numeral 146 designates an extendable section of the boom which includes the top 148 connected to the sides 150 and 152 and bottom 154 of a dimension to slide into and from the main boom. The top 148 of the extendable boom section contacts the rollers 124 and 122, and the bottom of the extendable boom contacts the rollers 136 and 138. The side walls of the extendable boom section slide against the inner surfaces of the side walls of the main boom.

A ram 156 is provided which is located within the extendable boom, and the ram is mounted on the inner end on the pin 158 connected to the sidewalls 106 and 108 on the outer end of the pin 160 connected to the side walls 150 and 152 of the extendable boom 146. With the operation of the ram 156 by conventional hydraulic means the extendable boom 146 may be retracted into or extended from the main boom 88.

Figure 12:
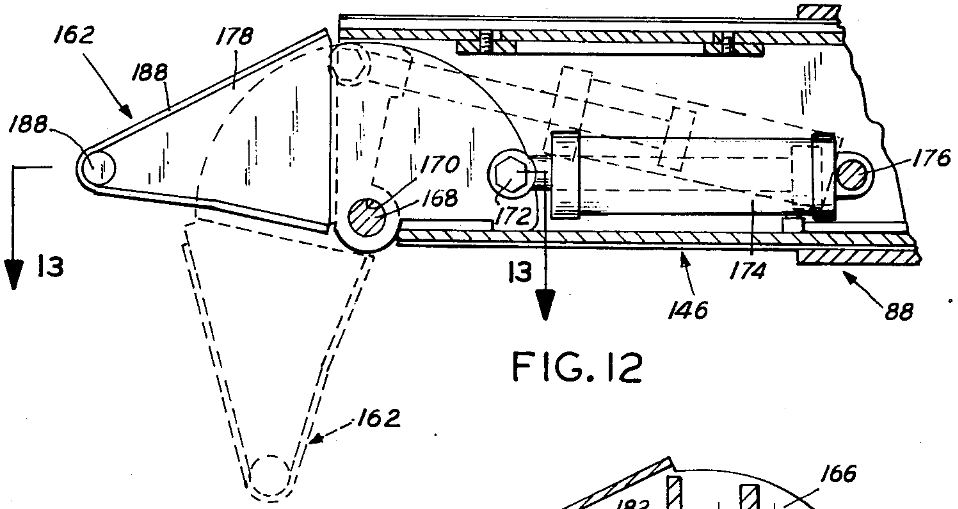
FIG. 12 is a sectional view on the line 12—12 of FIG. 11.
Figure 14:
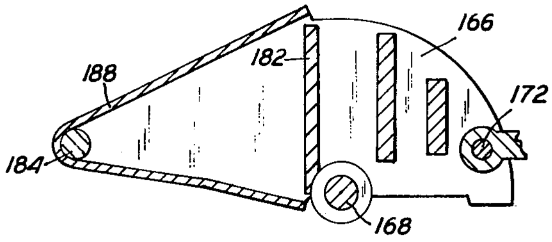
FIG. 14 is a sectional view on the line 14—14 of FIG. 13.
Figure 13:
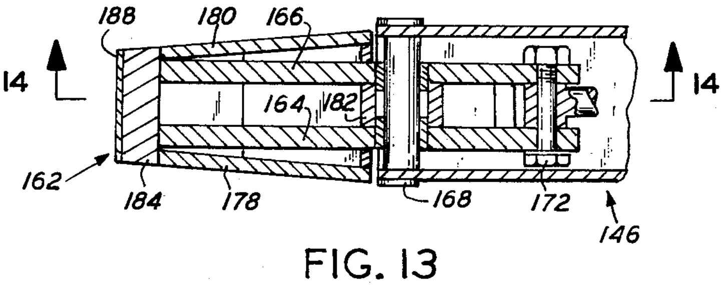
FIG. 13 is a sectional view on the line 13—13 of FIG. 12.

Further provided is the rock-engaging hook 162 which includes the pair of identical plates 164 and 166. The plates 164 and 166 are pivotally mounted centrally and at the lower edge on the pin 168 which pin is mounted in holes 170 formed in the side walls of the extendable boom 146 at the outer end of the boom. A pin 172 is secured to the rear end of the plates 164 and 166 in which is pivotally secured the outer end of the ram 174. The inner end of the ram 174 is pivotally connected to the pin 176 connected to the side walls 150 and 152. With the operation of the ram 174 by conventional hydraulic means the hook 162 may be pivoted as illustrated in particular in FIG. 12, to accommodate the uneven rock surfaces and positions of the rock to be moved or dislodged.

Due to the hard nature of the material handled there is provided the reinforcing and protective side members 178 and 180 secured at the rear ends to the support 182 secured to the plates 164 and 166. The front ends of the side members 178 and 180 are connected to the transverse nose piece 184. The nose piece 184 is also connected to the outer ends of the plates 164 and 166 thereby making a rugged and strengthened rock-engaging portion of the hook device. The outer top end and bottom of the hook is further protected by the abrasion resistant metal layer or skin 188 connected thereto to reduce wear.

Secured to the cross beam *26a* is the I beam 190 upon which is mounted the decking 192 which mounts the conventional hydraulic supply tank 194 and pump 196 together with an operator's conventional control console 198.

Figure 8:
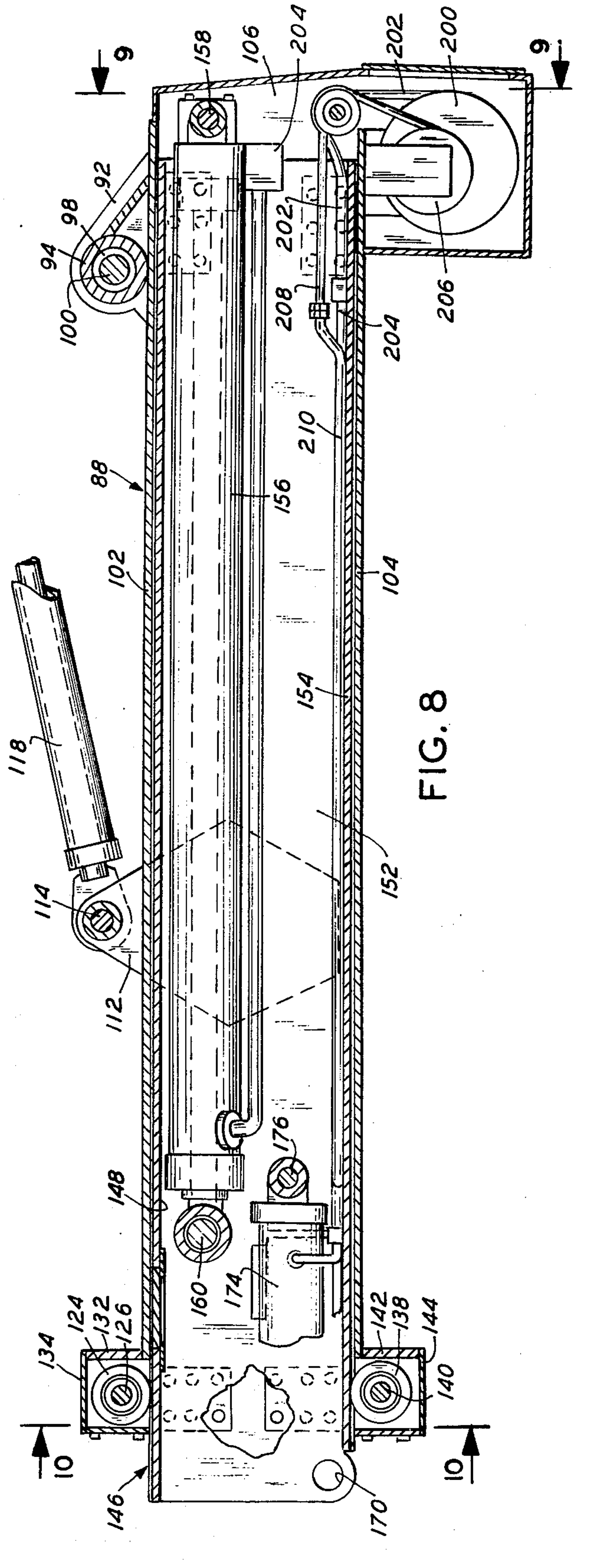
FIG. 8 is a sectional view on the line 8—8 of FIG. 7.
Figure 9:
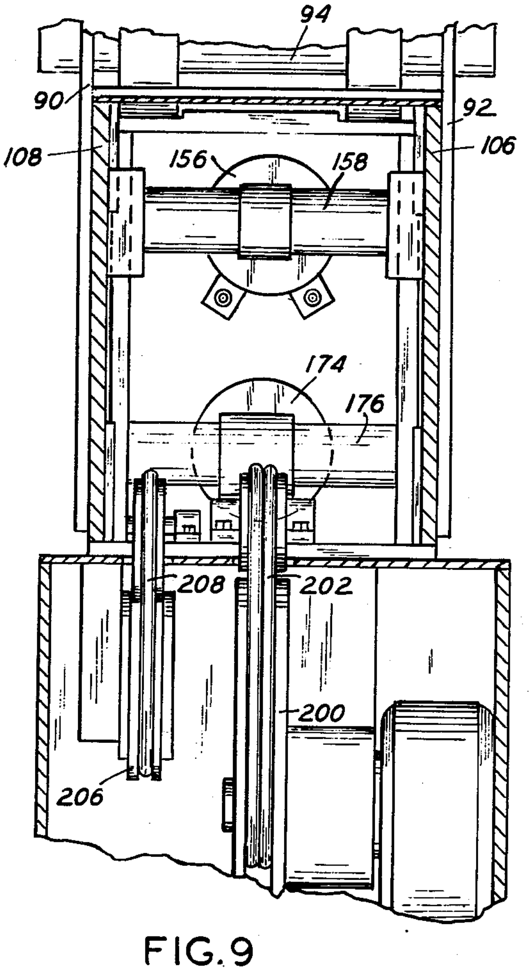
FIG. 9 is a sectional view on the line 9—9 of FIG. 8 at the pivotal rear end of the boom.
Figure 10:
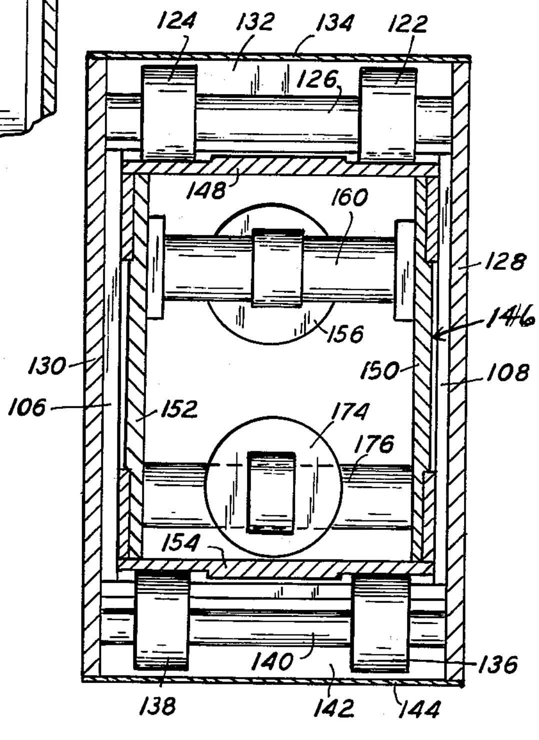
FIG. 10 is a sectional view on the line 10—10 of FIG. 8 at the outer end of the main boom and showing both main and extendable outer boom.
Figure 11:
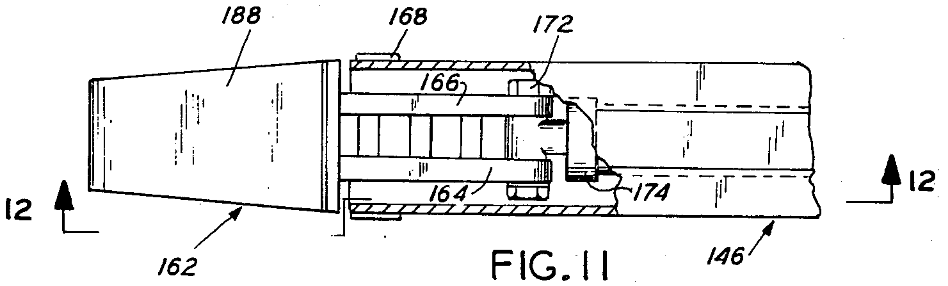
FIG. 11 is a view of a portion of the outer end of the extendable boom.

Further provided and as best shown in FIGS. 8 and 9 is a first hydraulic line storage and spring loaded reel 200 having the line 202 connected to the feed conduit 204 for the ram. Also provided is the lubrication line storage and spring loaded reel 206 leaving the line 208 connected to the feed conduit 210 for the lubrication elements which lubricate rollers 122, 124, 136, 138, and pivot 170 and 176. The line 202 is supplied with fluid pressure from the console 198 by conventional hydraulic means. cl Operation In using the device A let it be supposed that the rock R is of such a size or configuration or in such a position in the crusher that the rock crusher C cannot crush the rock. It will be seen that the turntable 38 may be rotated through 360° and the boom pivoted to dislodge the rock with the hook 162 pivoted if necessary to engage and move the rock. If such movements are not sufficient to engage the rock and move it, then the turntable 65 may be rotated together with rotation of turntable 38 or either turntable may be used singly. Additionally the extendable boom 146 may be extended if necessary to allow the hooks to engage the rock R and more it to a position where it may be subjected to the action of the crusher. It will be seen that with the capability of the device the crusher element Cr poses no problem as to placing the hook against the rock for movement of the rock.

Having thus described the invention, what is claimed as new and desired to be secured by letters Patent is:

1. Device for moving a rock at the entrance of a rock crusher comprising:

a. an elongated support having means for mounting the support horizontally upon a horizontal wall,
b. first rotatable means carried by said support and depending therefrom,
c. second rotatable means,
d. rigid means extending within the extent of said elongated support and connecting said second rotatable means to said first rotatable means in depending relation with the rotational axis thereof offset from that of said first rotatable means,
e. a boom,
f. means pivotally mounting the inner end of said boom on said second rotatable means pivotal from a first horizontal position to and from alternatively depending angularly disposed positions,
g. means connected to said boom and said second rotatable means for pivoting said boom in a substantially vertical plane,
h. a hook,
i. means pivotally mounting said hook on the outer free end of said boom,
j. means mounted on said first rotatable means for rotating said first rotatable means on said support,
k. means mounted on said second rotatable means for rotating said second rotatable means on said connecting means, and
e. means for pivotally moving said hook.

2. The device of claim 1 in which said boom includes:

a. a main boom portion and,
b. a secondary boom section slidably mounted on said main boom,
c. means for slidably extending and retracting said secondary boom portion relative to said main boom portion.

3. The device of claim 2 in which said first rotatable means includes:

a. a head member having
b. a ring gear mounted thereon and,
c. means for rotating said ring gear to thereby rotate said first rotatable means whereby said second rotatable means and said boom thereon are rotated about the axis of said first rotatable means.

4. The device of claim 3 in which said second rotatable means includes:

a. a head member having b. a ring gear mounted thereon, and c. means for rotating said ring gear to thereby rotate said second rotatable means and said boom therewith.

5. The device of claim 1 in which said first rotatable means includes:

a. a head member having b. a ring gear mounted thereon, c. means for rotating said ring gear to thereby rotate said first rotatable means whereby said second rotatable means and said boom thereon are rotated about the axis of said first rotatable means, d. said second rotatable means including a head member having e. a ring gear mounted thereon, and f. means for rotating said ring gear to thereby rotate said second rotatable means and said boom therewith.

6. The device of claim 1 in which said first rotatable means includes:

a. a head member having b. a ring gear mounted thereon, and c. means for rotating said ring gear to thereby rotate said first rotatable means whereby said second rotatable means and said boom thereon are rotated about the axis of said rotatable means.

7. The device of claim 1 in which said second rotatable means includes:

a. a head member having b. a ring gear mounted thereon, and c. means for rotating said ring gear to thereby rotate said second rotatable means and said boom therewith.

* * * * *